United States Patent
Prinsloo et al.

(10) Patent No.: US 10,454,764 B2
(45) Date of Patent: Oct. 22, 2019

(54) SYSTEM AND METHOD FOR MANAGING MACHINE IMAGES ON A PLURALITY OF DISTRIBUTED SERVERS

(71) Applicant: Invensys Systems, Inc., Foxboro, MA (US)

(72) Inventors: Johan Prinsloo, Fallbrook, CA (US); Geoffrey Tarcha, Solana Beach, CA (US); Roy Li, Yorba Linda, CA (US); Jagan Annamalai, Fulshear, TX (US); Chau Duong, Vista, CA (US); Andrew Goorchenko, Oceanside, CA (US); Marlina Lukman, San Diego, CA (US); Ian Willetts, Carlsbad, CA (US)

(73) Assignee: SCHNEIDER ELECTRIC SOFTWARE, LLC, Lake Forset, CA (US)

( * ) Notice: Subject to any disclaimer, the term of this patent is extended or adjusted under 35 U.S.C. 154(b) by 0 days.

(21) Appl. No.: 15/371,471

(22) Filed: Dec. 7, 2016

(65) Prior Publication Data

US 2018/0159736 A1 Jun. 7, 2018

(51) Int. Cl.
G06F 15/173 (2006.01)
H04L 12/24 (2006.01)
H04L 29/08 (2006.01)
G06F 11/36 (2006.01)
(Continued)

(52) U.S. Cl.
CPC ............ *H04L 41/0846* (2013.01); *G06F 8/63* (2013.01); *G06F 8/65* (2013.01); *G06F 11/3684* (2013.01); *H04L 67/1095* (2013.01)

(58) Field of Classification Search
CPC . H04L 41/0846; H04L 67/1095; H04L 12/24; H04L 29/08; G06F 11/3684; G06F 8/63; G06F 8/65
See application file for complete search history.

(56) References Cited

U.S. PATENT DOCUMENTS

| 7,546,595 B1 | 6/2009 | Wickham et al. |
| 8,490,084 B1 | 7/2013 | Alford et al. |
| 9,760,736 B2 * | 9/2017 | Clarke ................ G06F 21/6281 |

(Continued)

OTHER PUBLICATIONS

Extended European Search Report for 17205471.0, dated Apr. 9, 2018 (9 pages).

*Primary Examiner* — Cheikh T Ndiaye
(74) *Attorney, Agent, or Firm* — Locke Lord LLP

(57) ABSTRACT

A system manages machine images on a plurality of distributed servers over a network. A service processor generates installation instructions for building a machine image on a remote server, the machine image comprising a component, the installation instructions including instructions for the remote server to access the component from a source of the component. A reactive management processor is coupled to the service processor, accesses the source of the component, to detect whether an update of the component exists, and to notify the service processor of existence of the detected update. The service processor generates revised installation instructions for rebuilding a revised machine image on the remote server in response to the notification of the update from the reactive management processor. The service processor transmits a global rebuild command and the revised installation instructions for rebuilding the revised machine image.

18 Claims, 8 Drawing Sheets

(51) Int. Cl.
  *G06F 8/61*   (2018.01)
  *G06F 8/65*   (2018.01)

(56) References Cited

U.S. PATENT DOCUMENTS

| | | |
|---|---|---|
| 2008/0098094 A1 | 4/2008 | Finkelstein et al. |
| 2009/0288079 A1 | 11/2009 | Zuber et al. |
| 2009/0300641 A1* | 12/2009 | Friedman ............ G06F 11/3664 718/104 |
| 2011/0173605 A1 | 7/2011 | Bourne |
| 2013/0297922 A1* | 11/2013 | Friedman .................. G06F 8/63 713/2 |
| 2013/0318147 A1 | 11/2013 | Dufrene et al. |
| 2014/0359602 A1 | 12/2014 | Sawaya et al. |
| 2017/0249127 A1* | 8/2017 | Parees ....................... G06F 8/30 |

\* cited by examiner

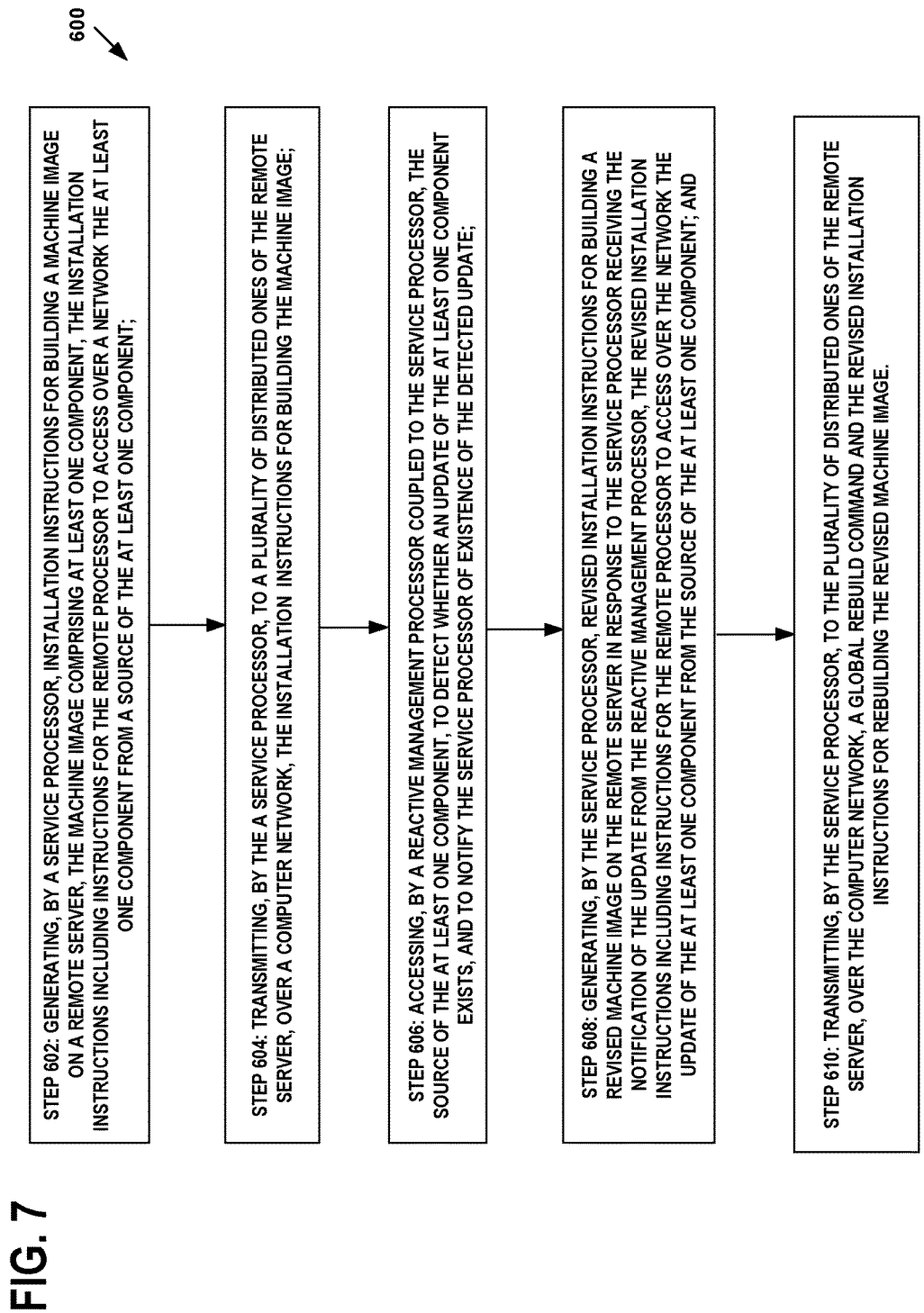

SYSTEM AND METHOD FOR MANAGING MACHINE IMAGES ON A PLURALITY OF DISTRIBUTED SERVERS

FIELD OF THE INVENTION

The invention disclosed relates to managing machine images and more particularly relates to a distributed system for managing machine images on a plurality of distributed servers.

BACKGROUND OF THE INVENTION

Existing systems and methods of installing software updates on computing devices connected to a network, are based on a publisher of the software pushing the updated software files to the computing devices over the network. Then the updated software is installed on the computing devices in accordance with instructions obtained from the publisher.

What is needed is a technology to solve the problem of maintaining application containers with complex installs across a network of cloud vendors and regions. What is needed is to enable online services that rely on cloud-based ephemeral machine instances to keep their catalog of machine images up to date automatically, which has benefits for security and engineering efficiency. It is critical to keep online software up to date with the latest security patches from all software vendors.

SUMMARY OF THE INVENTION

Example embodiments of the invention solve the problem of maintaining and updating application containers with complex installs across cloud vendors and regions.

In an example embodiment of the invention, a distributed system manages machine images on a plurality of distributed servers over a computer network. A service processor generates installation instructions for building a machine image on a remote server, the machine image comprising at least one component, the installation instructions including instructions for the remote server to access over a network the at least one component from a source of the at least one component. The service processor transmits to a plurality of distributed ones of the remote server, over a computer network, the installation for building the machine image.

A reactive management processor coupled to the service processor, accesses the source of the at least one component, to detect whether an update of the at least one component exists, and to notify the service processor of existence of the detected update.

The service processor generates revised installation instructions for building a revised machine image on the remote server in response to the service processor receiving the notification of the update from the reactive management processor, the revised installation instructions including instructions for the remote server to access over the network the update of the at least one component from the source of the at least one component. The service processor transmits to the plurality of distributed ones of the remote server, over the computer network, a global rebuild command and the revised installation instructions for rebuilding the revised machine image.

The global rebuild command is transmitted by the service processor in response to at least one of a change to the installation instructions, a change to an installed software component, a changes to a library used, or a change to a base operating system patch status.

The source of the at least one component may be a publisher of software components or a storage device storing software components.

The service processor is further configured to generate instructions for automatic functional tests to be performed on the machine image after having been built on the remote server, the instructions for functional tests being transmitted with the installation instructions to the plurality of distributed ones of the remote server, over the computer network.

The service processor is further configured to generate revised instructions for automatic functional tests to be performed on the revised machine image after having been rebuilt on the remote server, the revised instructions for functional tests being transmitted with the revised installation instructions to the plurality of distributed ones of the remote server, over the computer network.

A machine image builder software executes the installation instructions for building the machine image on the remote server, for each of the plurality of distributed ones of the remote server in the computer network.

The example embodiments of the invention harness network architecture and exploit it by utilizing a non-conventional and non-generic arrangement of components to manage machine images on a plurality of distributed servers over a computer network, to maintain and update application containers with complex installs across a network of cloud-based vendors and regions.

DESCRIPTION OF THE FIGURES

FIG. 7 is a flow diagram of an example programmed method executed by the service processor to generate revised instructions to rebuild the machine image built on the distributed servers and to distribute a global rebuild command to the distributed servers, in response to the detection of an update by the reactive management processor.

DISCUSSION OF THE EMBODIMENTS

Example embodiments of the invention solve the problem of maintaining application containers with complex installs across a network of distributed cloud-based vendors and regions. Example embodiments of the invention enable online services that rely on cloud-based ephemeral machine instances to keep their catalog of machine images up to date automatically, to keep online software up to date with the latest security patches from all software vendors.

Figure 1:
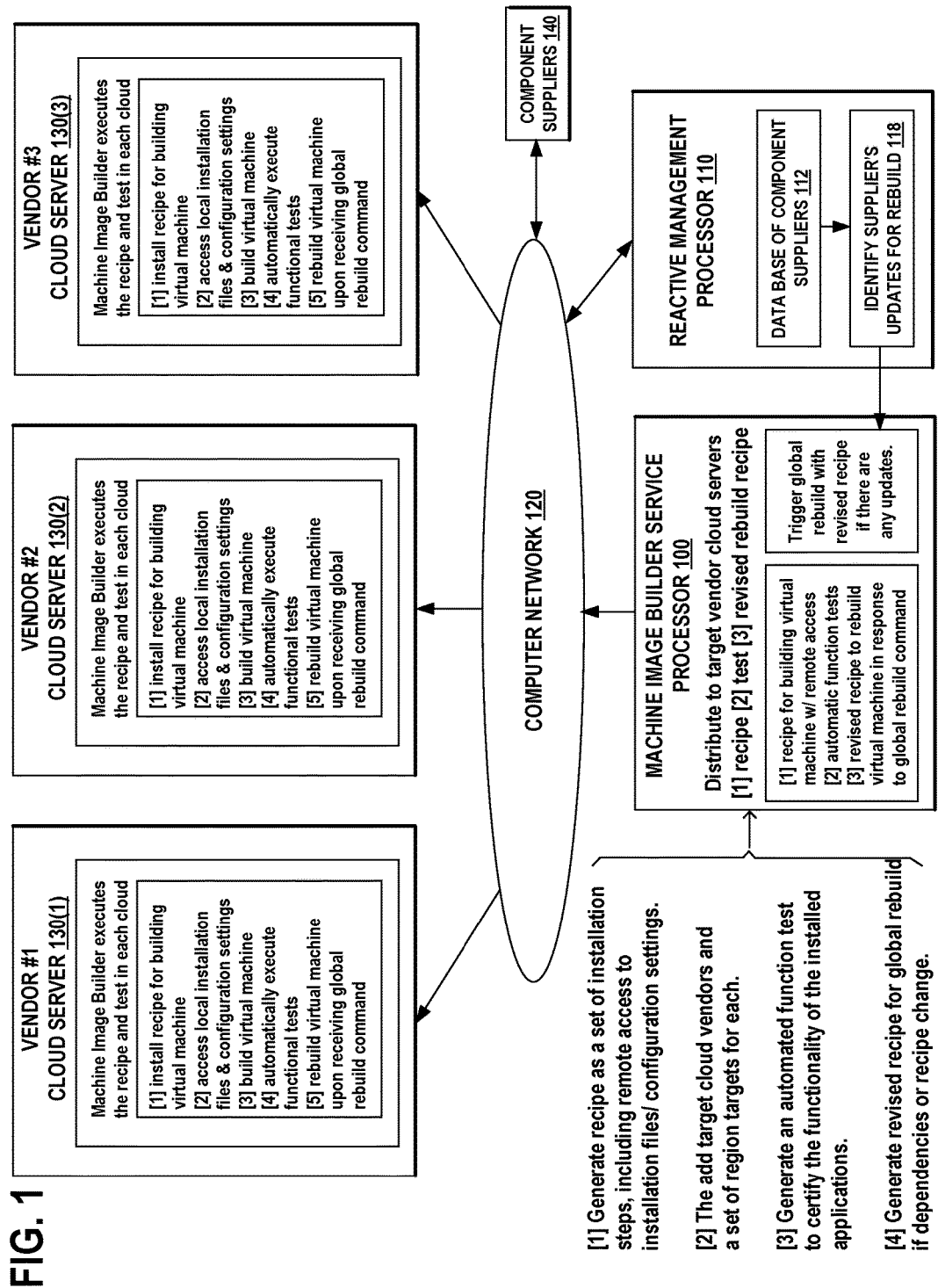
FIG. 1 illustrates an example embodiment of the invention, showing a distributed system including a service processor and a plurality of distributed servers in a computer network. The service processor is configured to generate installation instructions to build a machine image on the distributed servers and to generate automatic functional tests to be performed on the machine image after having been built on the distributed servers. A reactive management processor is coupled to the service processor and configured to access a source of at least one component of the machine image, to detect whether an update of the at least one component exists, and to notify the service processor of the existence of the detected update. The service processor is configured to generate revised instructions to rebuild the machine image built on the distributed servers and to distribute a global rebuild command to the distributed servers, in response to the detection of an update by the reactive management processor.

FIG. 1 illustrates an example embodiment of the invention, showing a distributed system including a machine image builder service processor 100 and a plurality of distributed vendor cloud servers 130(1), 130(2), and 130(3) in a computer network (e.g., Internet) 120. The service processor 100 is configured to generate installation instructions to build a machine image on the distributed servers and to generate automatic functional tests to be performed on the machine image after having been built on the distributed servers. A reactive management processor 110 is coupled to the service processor 100 and they may run on the same machine. The reactive management processor 110 is configured to access a source of at least one component of the machine image, to detect whether an update of the at least one component exists, and to notify the service processor 100 of the existence of the detected update. The service processor 100 is configured to generate revised instructions to rebuild the machine image built on the distributed servers 130(1), 130(2), and 130(3) and to distribute a global rebuild command to the distributed servers, in response to the detection of an update by the reactive management processor 110.

Figure 2:
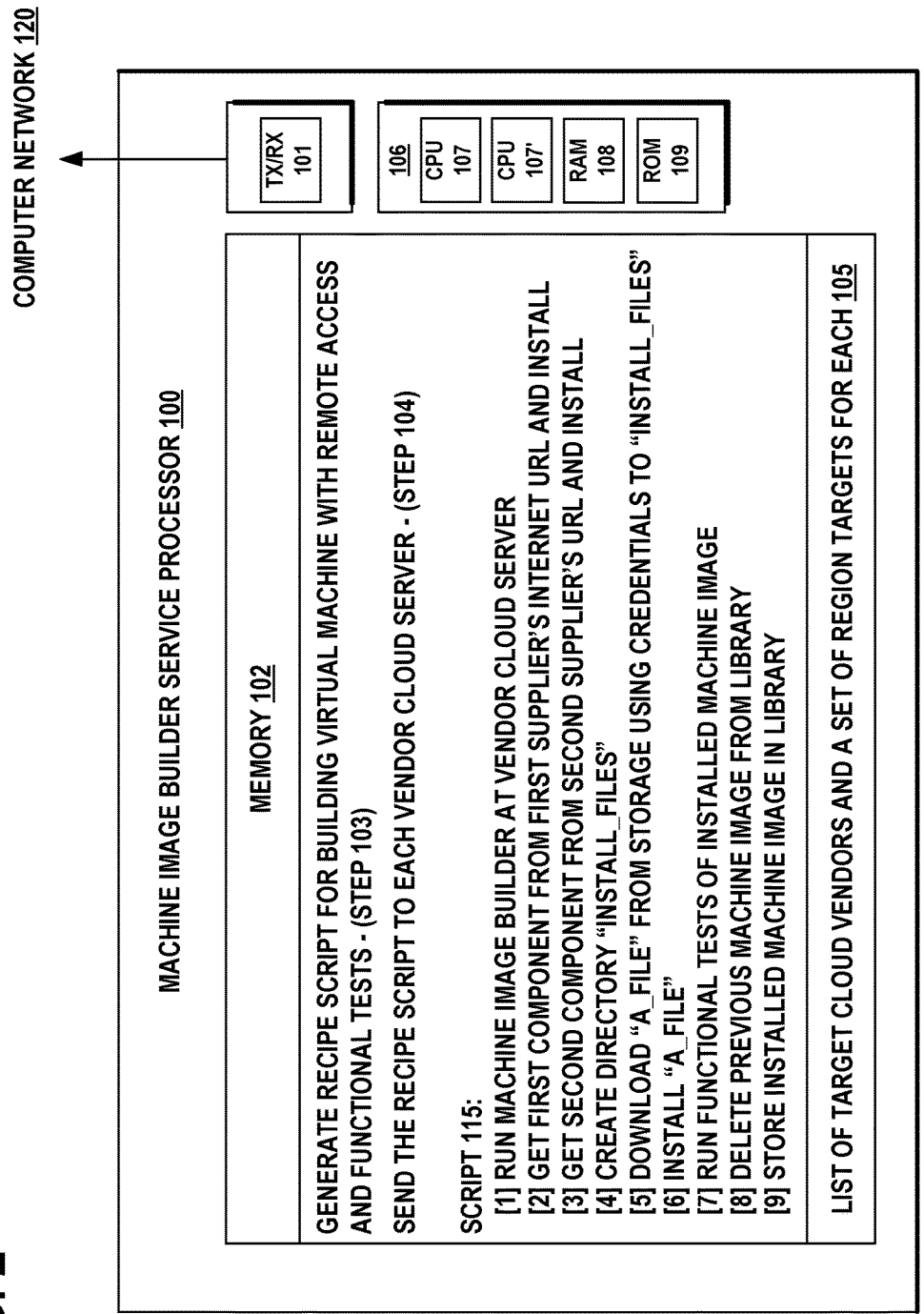
FIG. 2 illustrates an example embodiment of the invention, showing the service processor having generated the installation instructions to build a machine image on the distributed servers.

FIG. 2 illustrates an example embodiment of the invention, showing the service processor 100 having generated the installation instructions in step 103 as a recipe script 115 to build a machine image on the distributed servers 130(1), 130(2), and 130(3).

The service processor 100 sends the recipe script 115 to each vendor cloud server in step 104.

An example of the recipe script 115 may include the following instructions:
[1] run machine image builder at vendor cloud server
[2] get first component from first supplier's internet URL and install
[3] get second component from second supplier's URL and install
[4] create directory "install_files"
[5] download "A_file" from storage using credentials to "install_files"
[6] install "A_file"
[7] run functional tests of installed machine image
[8] delete previous machine image from library
[9] store installed machine image in library.

An example of the script instruction [2] to get the first component from the first supplier's internet URL and install, is shown in Table A:

TABLE A install package 'Java(TM) 8 Update 111' do
    source 'http://download.oracle.com/otn-pub/java/jdk/8u111-b14/jdk-8u111-windows-x64.exe'
end The service processor 100 is further configured to generate instructions for automatic functional tests to be performed on the machine image after having been built on each remote server 130(1), 130(2), and 130(3), the instructions for functional tests being transmitted with the installation instructions script 115 to the plurality of distributed ones 130(1), 130(2), and 130(3) of the remote server, over the computer network 120.

An example of the script instruction for automatic functional tests of the completed machine image on the server 130(1), is shown in Table B:

TABLE B

```
"smoketestSteps": [
    {
        "id": "checkDynsimService",
        "action": "process_status",
        "payload": {
            "automationSpecType": "ProcessStatus",
            "cmd": "isFound",
            "processname": "DynsimService.exe
        },
        "description": "DynsimService.exe status",
        "precursors": [ ]
    },
    {
```

The service processor 100 also sends a list of target cloud vendors and a set of region targets for each, to each vendor cloud server in step 105.

The service processor 100 includes a processor 106 comprising a dual central processor unit (CPU) or multi-CPU 107/107', a random access memory (RAM) 108 and read only memory (ROM) 109. The memories 108 and/or 109 include computer program code to carry out the functions of the service processor 100. A transmitter/receiver TX/RX 101 enables communication with the computer network 120.

Figure 3:
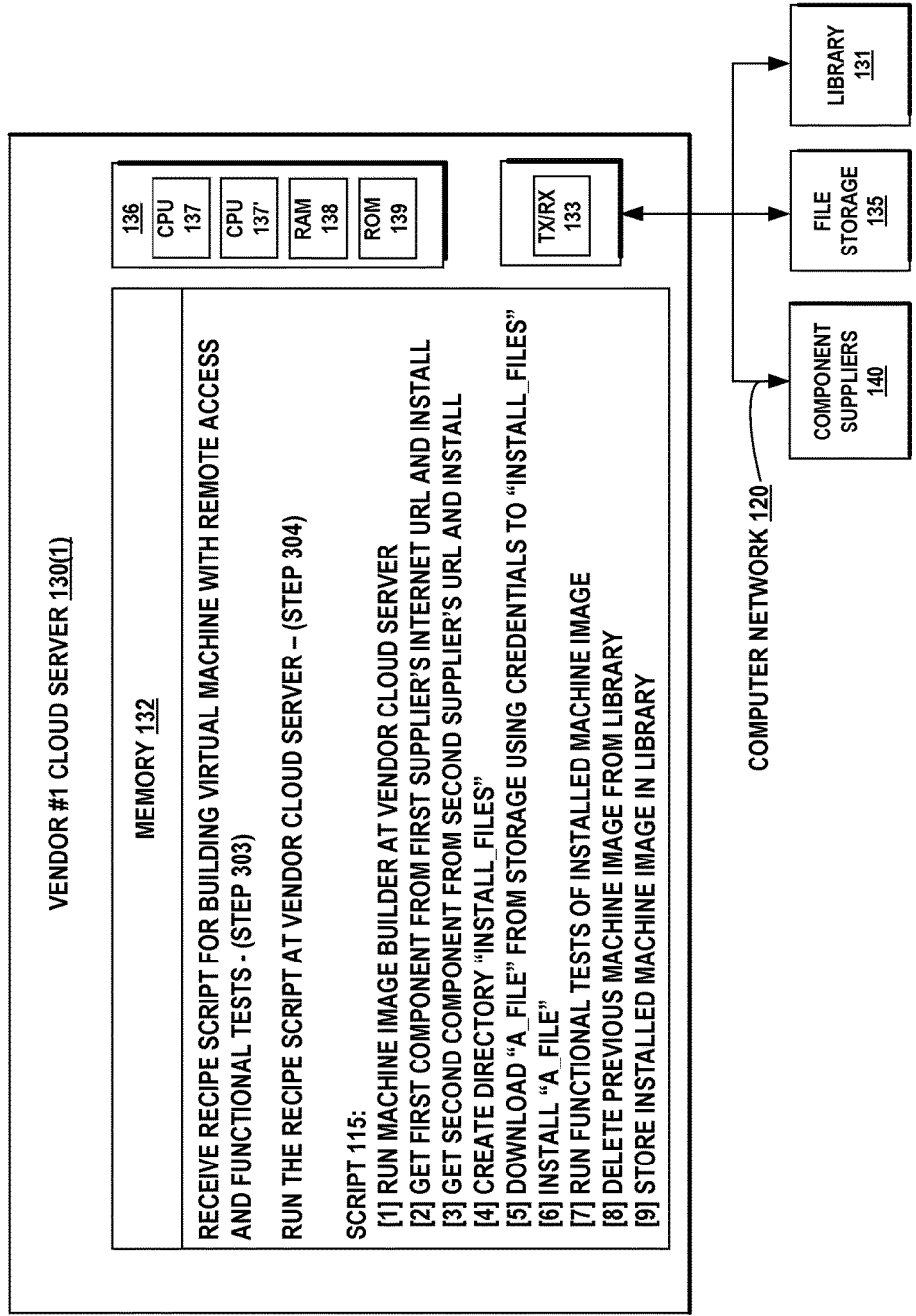
FIG. 3 illustrates an example embodiment of the invention, showing a distributed server in the computer network, having received the installation instructions to build a machine image on the server.

FIG. 3 illustrates an example embodiment of the invention, showing a distributed server 130(1) in the computer network 120, having received the installation instructions in the script 115 to build a machine image on the server. The distributed server 130(1) receives the recipe script for building a virtual machine with remote access and functional tests in step 303. The distributed server 130(1) runs the recipe script 115 in step 304. The distributed server 130(1) accesses components identified in the script 115, from the respective suppliers 140 of the components via their respective internet URLs. The suppliers 140 may be publishers of software components. The distributed server 130(1) may also access components identified in the script 115, from a storage device 135 storing software components. The accessed components are then installed on the distributed server 130(1) by the machine image builder. The machine image builder software executes the installation instructions in the script 115 for building the machine image on the distributed server 130(1), for each of the plurality of distributed ones 130(1), 130(2), and 130(3) of the remote server in the computer network 120. The installed machine image may then be stored in the library 131.

The distributed server 130(1) includes a processor 136 comprising a dual central processor unit (CPU) or multi-CPU 137/137', a random access memory (RAM) 138 and read only memory (ROM) 139. The memories 138 and/or 139 include computer program code to carry out the functions of the distributed server 130(1). A transmitter/receiver TX/RX 131 enables communication with the component suppliers over the computer network 120, and communication with the file storage 135 and the library 131.

Figure 3A:
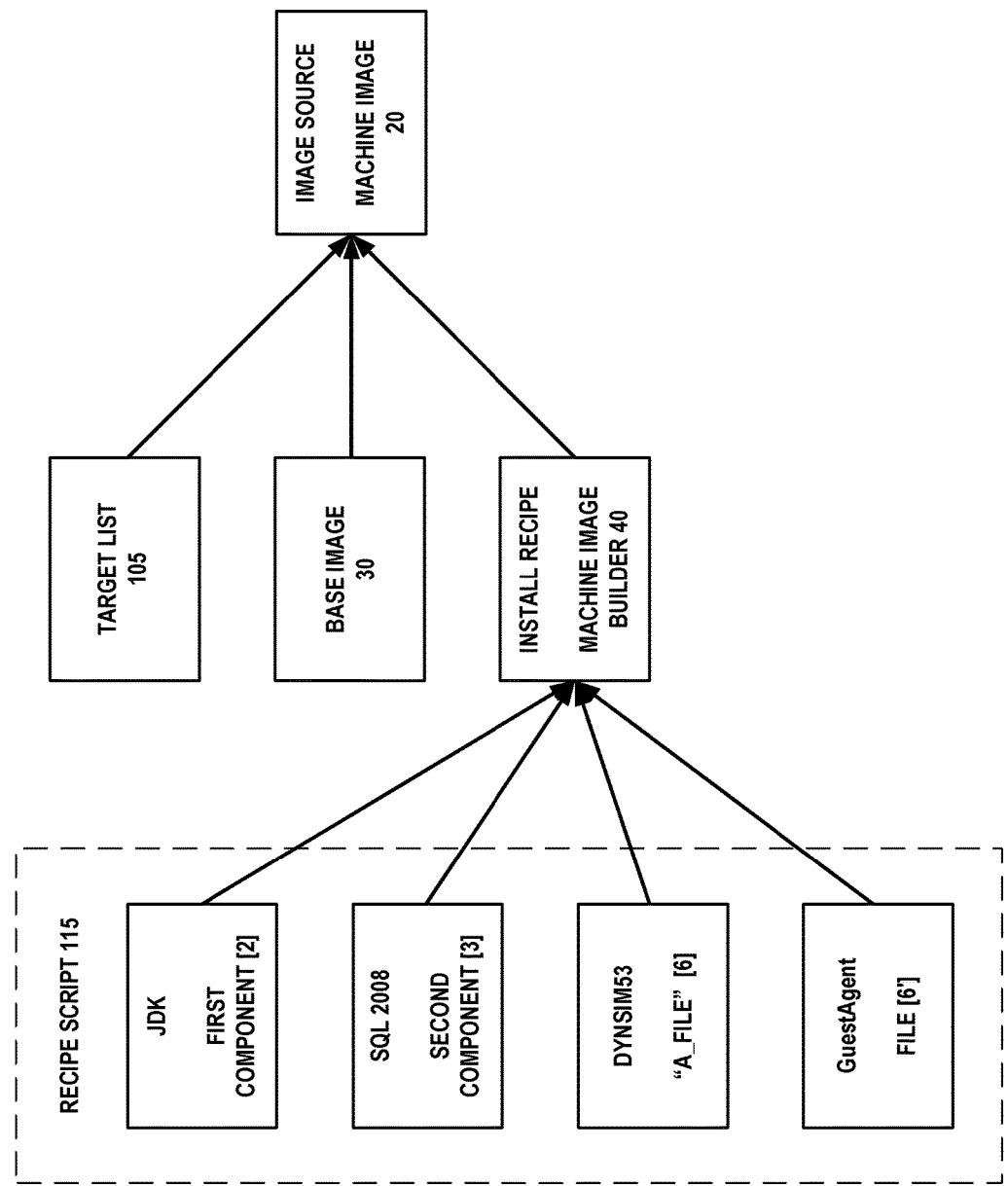
FIG. 3A illustrates an example embodiment of the invention, showing a schematic figure of the components of the machine image and their installation by the machine image builder on the distributed server based on the received installation instructions.

FIG. 3A illustrates an example embodiment of the invention, showing a schematic figure of the components of the machine image and their installation by the machine image builder on the distributed server 130(1), based on the received installation instructions in the script 115. An example of the components of the machine image is:

Windows 2008R2+SQL Server+JDK1.8.74+DYNSIM 5.3.2+Software Agent.
  a) OS (Windows 2008R2)
  b) DataBase (SQL Server)
  c) App Container (JDK 1.8.74)
  d) Application (DYNSIM 5.3.2)
  e) Utility Service (Software Agent 0.1.5)

The example machine image 20 is created on the base operating system of the distributed server 130(1), with the example of the components and their dependencies. The Image Source machine image 20 includes information for the software, target list 105 and base image 30.
  a) The Target List is a list of cloud vendors and regions that should receive the resulting machine image.
  b) The Base Image is a minimal machine image published by OS vendors (Canonical, Red Hat and Microsoft) that contains only the latest version of the Operating System.

Figure 4:
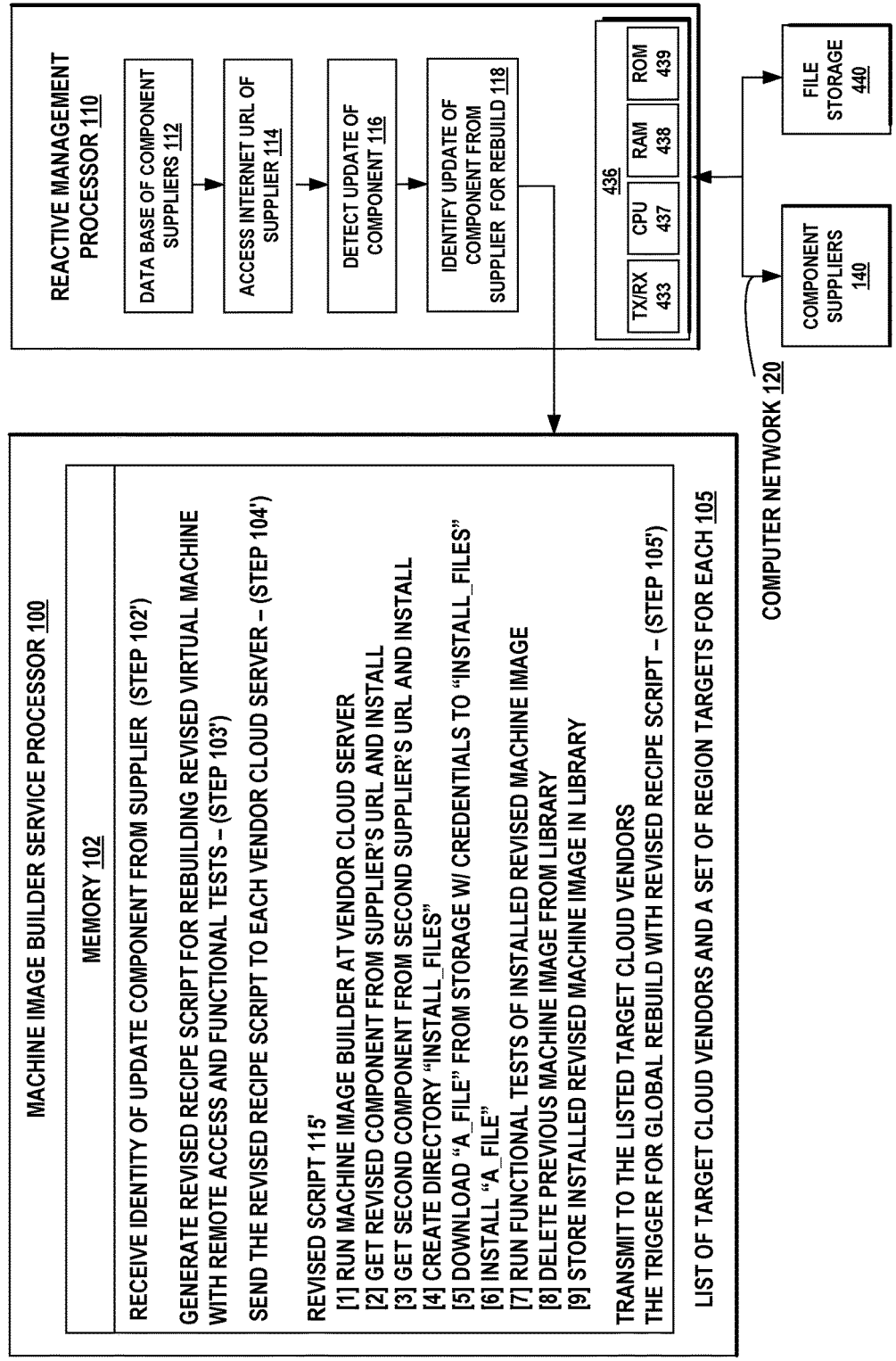
FIG. 4 illustrates an example embodiment of the invention, showing the reactive management processor accessing a source of at least one component of the machine image, and detecting that there has been an update of the at least one component. The reactive management processor is shown notifying the service processor of the existence of the detected update. The service processor is shown generating revised instructions to rebuild the machine image built on the distributed servers and distributing a global rebuild command to the distributed servers, in response to the detection of the update by the reactive management processor.

FIG. 4 illustrates an example embodiment of the invention, showing the reactive management processor 110 including a database of component suppliers 112. The reactive management processor 110 is shown accessing at 114, the Internet URL of a component supplier 140 source of at least one component of the machine image. The reactive management processor 110 is shown detecting at 116, that there has been an update of the at least one component. The reactive management processor 110 is shown notifying at 118, the service processor 100 of the existence of the detected update.

The reactive management processor 110 includes a processor 436 comprising a dual central processor unit (CPU) or multi-CPU 437, a random access memory (RAM) 438 and read only memory (ROM) 439. The memories 438 and/or 439 include computer program code to carry out the functions of the reactive management processor 110. A transmitter/receiver TX/RX 433 enables communication with the component suppliers over the computer network 120, and communication with the file storage 440.

The service processor 100 is shown receiving the identity of the updated component from the supplier at step 102'. The service processor 100 is shown generating revised instructions script 115' at step 103', to rebuild the machine image built on the distributed servers 130(1), 130(2), and 130(3). The service processor 100 is shown distributing a global rebuild command at step 105', to the distributed servers 130(1), 130(2), and 130(3), in response to the detection of the update by the reactive management processor 110.

Figure 5:
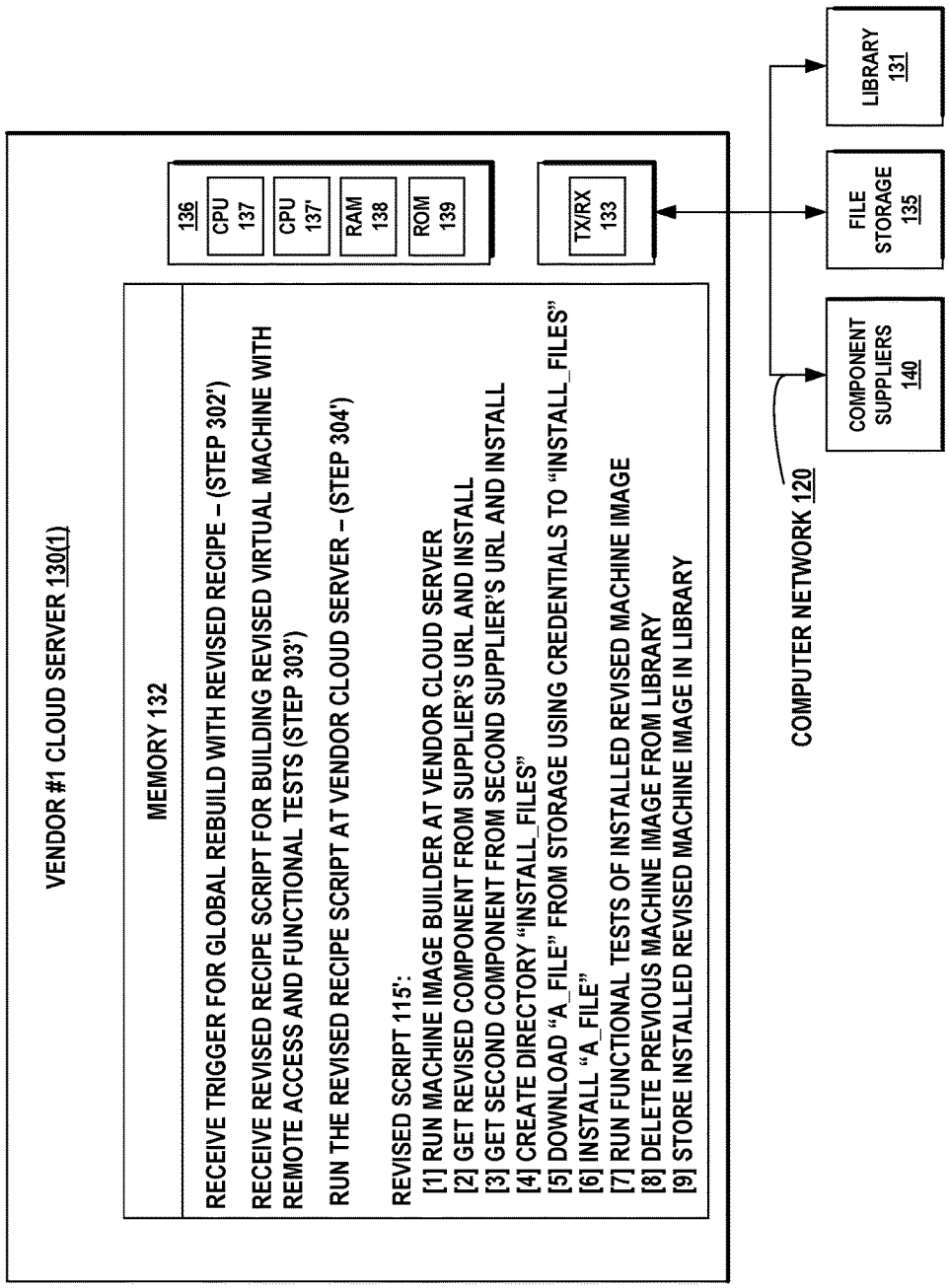
FIG. 5 illustrates an example embodiment of the invention, showing the distributed server in the computer network, having received the revised installation instructions to rebuild a revised machine image on the server.

FIG. 5 illustrates an example embodiment of the invention, showing the distributed server 130(1) in the computer network 120, receiving the trigger for global rebuild with the revised recipe script 115' at step 302'. The distributed server 130(1) receives the revised installation instructions script 115' to rebuild a revised machine image on the server 130(1) at step 303'. The distributed server 130(1) runs the revised recipe script 115' at step 304' to rebuild a revised machine image on the server. The distributed server 130 accesses components identified in the script 115', from the respective suppliers 140 of the components via their respective internet URLs. The suppliers 140 may be publishers of software components. The distributed server 130 may also access components identified in the script 115', from the storage device 135 storing software components. The accessed components are then installed on the distributed server 130(1) by the machine image builder. The machine image builder software executes the revised installation instructions in the script 115' for rebuilding the machine image on the distributed server 130(1), for each of the plurality of distributed ones 130(1), 130(2), and 130(3) of the remote server in the computer network 120. The installed revised machine image may then be stored in the library 131.

Figure 6:
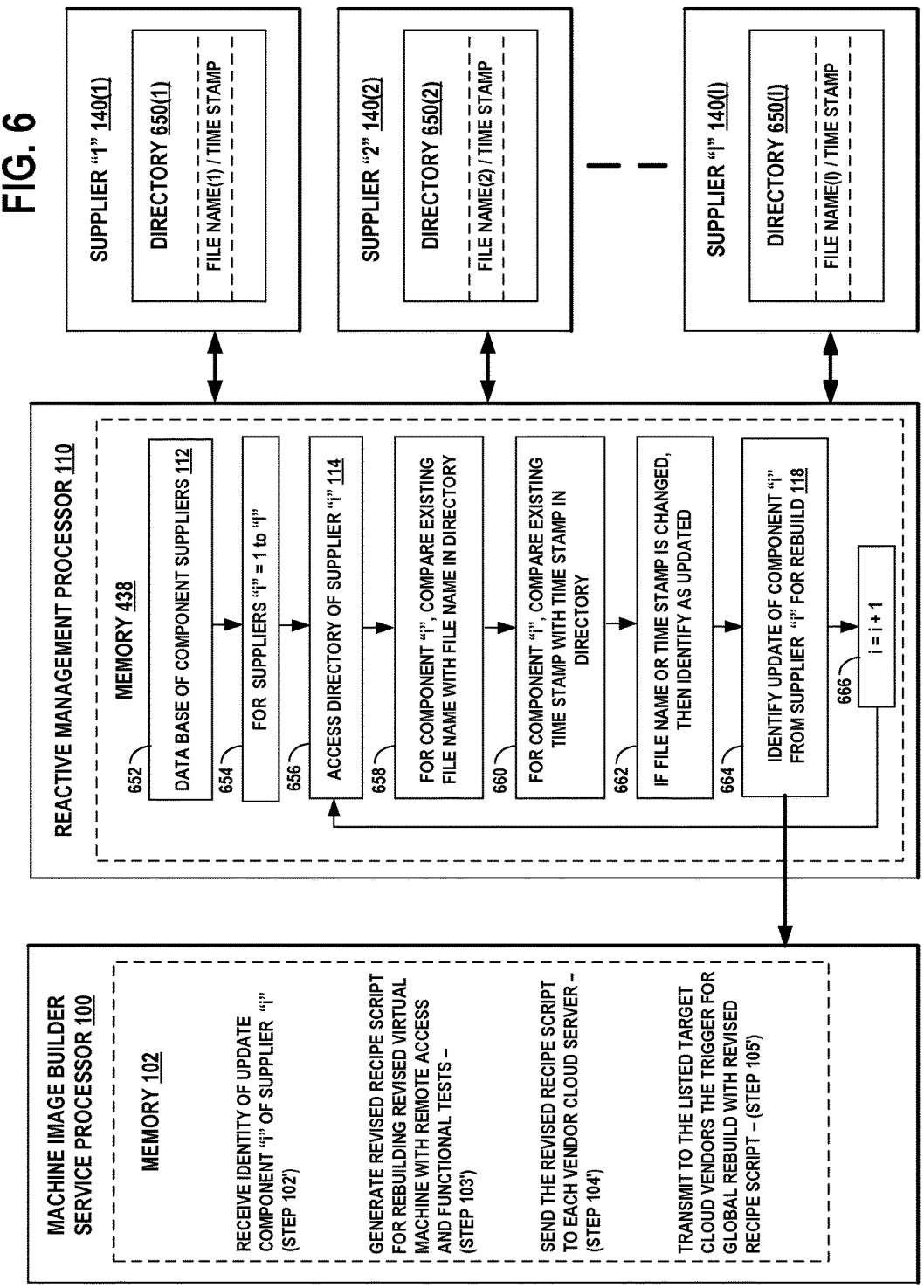
FIG. 6 illustrates an example embodiment of the invention, showing a more detailed depiction of the reactive management processor accessing several supplier sources components of the machine image and searching the suppliers' directories for the existence of any updates of the components. The reactive management processor is shown notifying the service processor of the existence detected updates.

FIG. 6 illustrates an example embodiment of the invention, showing a more detailed depiction of the reactive management processor 110 accessing several supplier sources 140(1), 140(2), to 140(I), of components of the machine image 20 and searching the suppliers' directories 650(1), 650(2), to 650(I), for the existence of any updates of the components. The reactive management processor is shown notifying the service processor 100 of the existence detected updates. In an alternate embodiment, the component suppliers may provide a push-notification of the existence of updates, to the reactive management processor.

The memory 48 of the reactive management processor 110 stores programmed instructions configured to access the supplier sources 140(1), 140(2), to 140(I), and search the suppliers' directories 650(1), 650(2), to 650(I), for the existence of any updates of the components of the machine image 20. An example sequence of instructions may begin with Instruction 652 to access a data base of component suppliers 112. This may follow with Instruction 654 to index through "I" suppliers. This may follow with Instruction 656 to begin a loop by accessing a directory of supplier "i" 114. This may follow with Instruction 658, for component "i", to compare an existing file name with a file name in the directory. This may follow with Instruction 660, for component "i", to compare an existing time stamp with a time stamp in directory. This may follow with Instruction 662 to determine if the file name or the time stamp is changed, then identify the file as updated. This may follow with Instruction 664 to identify the update of component "i" from supplier "i" for rebuild 118. This may follow with Instruction 666 to increase the index for component suppliers by one and then loop back to Instruction 656 to continue the loop for "I" suppliers.

The reactive management processor 110 is shown accessing at Instruction 656, the Internet URL of a, "i"th component supplier 140(i) of a component (i) of the machine image. The reactive management processor 110 is shown detecting at Instruction 662, that there has been an update of the "i"th component. The reactive management processor 110 is shown notifying at Instruction 664, the service processor 100 of the existence of the detected update. The service processor 100 is shown receiving the identity of the updated component from the reactive management processor 110.

The reactive management processor 110 attempts to look at the URL structure of the suppliers' directories. For example, if an SQL install is at the URL https://download.microsoft.com/download/c/2/8/123/SQLEXPR_x64_ENU.exe the reactive management processor 110 will find the partial URL https://download.microsoft.com/download/c/2/8/124/.

automatically.

For files that are not in a numbered path structure, for example, the user's own file:

s3://m6remotefolder/Dynsim53_BETA_InstallKit1.zip will be updated by simply replacing that file.

The reactive management processor 110 looks for updated timestamps on that file. The reactive management processor 110 remembers the existing file timestamp and identifies updates.

It is possible for the recipe script 115' to use authorized downloads of the installers, although this is not very common. The credentials may be stored in a separate credential store, not explicitly in the recipe script 115'. The encrypted credential store may be pushed to the vendor cloud server 130(1) with the recipe script 115' and decrypted on the fly using a one-time key. Software licenses may be handled in a similar fashion, with the license files downloaded by the vendor cloud server 130(1) from a separate authorized source.

FIG. 7 is a flow diagram 600 of an example programmed method executed by the system of FIG. 1, to generate revised instructions to rebuild the machine image built on the distributed servers and to distribute a global rebuild command to the distributed servers, in response to the detection of an update by the reactive management processor.

The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

At step 602, the service processor (e.g., 100 in FIG. 1) generates installation instructions for building a machine image on a remote server (e.g., 130(1) in FIG. 1), the machine image comprising at least one component, the installation instructions including instructions for the remote server to access over a network the at least one component from a source (e.g., 140 in FIG. 1) of the at least one component.

At step 604, the service processor transmits to a plurality of distributed ones of the remote server, over a computer network (e.g., the Internet), the installation instructions for building the machine image.

At step 606, the reactive management processor (e.g., 110 in FIG. 1) accesses the source of the at least one component, to detect whether an update of the at least one component exists, and to notify the service processor of existence of the detected update.

At step 608, the service processor generates revised installation instructions for building a revised machine image on the remote server in response to the service processor receiving the notification of the update from the reactive management processor 110, the revised installation instructions including instructions for the remote server to access over the network the update of the at least one component from the source of the at least one component.

At step 610, the service processor transmits to the plurality of distributed ones of the remote server, over the computer network, a global rebuild command and the revised installation instructions for rebuilding the revised machine image.

Although specific example embodiments of the invention have been disclosed, persons of skill in the art will appreciate that changes may be made to the details described for the specific example embodiments, without departing from the spirit and the scope of the invention.

The invention claimed is:

1. A distributed system for managing machine images on a plurality of distributed servers over a computer network, said system comprising:

a service processor, including at least one memory including computer program code, the at least one memory and the computer program code configured with the service processor, to generate installation instructions for a remote server of a plurality of distributed remote servers on a computer network, to build by the remote server a machine image on the remote server, the machine image comprising at least one component, the installation instructions including instructions for the remote server to access over the network the at least one component from a source of the at least one component;

the service processor, including a transmitter/receiver configured to transmit to the plurality of distributed remote servers, over the computer network, the installation instructions for building by the remote server the machine image on the remote server;

a reactive management processor coupled to the service processor, the reactive management processor including at least one memory including computer program code, the at least one memory and the computer program code configured with the reactive management processor, to access the source of the at least one component, to detect whether an update of the at least one component exists, and to notify the service processor of existence of the detected update;

the service processor further configured to generate revised installation instructions for building by the remote server a revised machine image on the remote server in response to the service processor receiving the notification of the update from the reactive management processor, the revised installation instructions including instructions for the remote server to access over the network the update of the at least one component from the source of the at least one component and to build the revised machine image on the remote server; and the service processor transmitting to the plurality of distributed remote servers, over the computer network, a global rebuild command and the revised installation instructions for rebuilding by the remote server the revised machine image on the remote server.

2. The distributed system of claim 1, wherein the global rebuild command is transmitted by the service processor in response to at least one of a change to the installation instructions, a change to an installed software component, a change to a library used, or a change to a base operating system patch status.

3. The distributed system of claim 1, wherein the source of the at least one component is a publisher of software components or a storage device storing software components.

4. The distributed system of claim 1, wherein the service processor is further configured to generate instructions for automatic functional tests to be performed on the machine image after having been built on the remote server, the instructions for functional tests being transmitted with the installation instructions to the plurality of distributed ones of the remote server, over the computer network.

5. The distributed system of claim 1, wherein the service processor is further configured to generate revised instructions for automatic functional tests to be performed on the revised machine image after having been rebuilt on the remote server, the revised instructions for functional tests being transmitted with the revised installation instructions to the plurality of distributed ones of the remote server, over the computer network.

6. The distributed system of claim 1, wherein a machine image builder software executes the installation instructions for building the machine image on the remote server, for each of the plurality of distributed ones of the remote server in the computer network.

7. A method for managing machine images on a plurality of distributed servers over a computer network, said method comprising:
   generating, by a service processor, installation instructions for a remote server of a plurality of distributed remote servers on a computer network, to build by the remote server a machine image on the remote server, the machine image comprising at least one component, the installation instructions including instructions for the remote server to access over the network the at least one component from a source of the at least one component;
   transmitting, by the a service processor, to the plurality of distributed remote servers, over the computer network, the installation instructions for building by the remote server the machine image on the remote server;
   accessing, by a reactive management processor coupled to the service processor, the source of the at least one component, to detect whether an update of the at least one component exists, and to notify the service processor of existence of the detected update;
   generating, by the service processor, revised installation instructions for building by the remote server a revised machine image on the remote server in response to the service processor receiving the notification of the update from the reactive management processor, the revised installation instructions including instructions for the remote server to access over the network the update of the at least one component from the source of the at least one component and to build the revised machine image on the remote server; and
   transmitting, by the service processor, to the plurality of distributed remote servers, over the computer network, a global rebuild command and the revised installation instructions for rebuilding by the remote server the revised machine image on the remote server.

8. The method of claim 7, wherein the global rebuild command is transmitted by the service processor in response to at least one of a change to the installation instructions, a change to an installed software component, a change to a library used, or a change to a base operating system patch status.

9. The method of claim 7, wherein the source of the at least one component is a publisher of software components or a storage device storing software components.

10. The method of claim 7, further comprising:
    generating, by the service processor, instructions for automatic functional tests to be performed on the machine image after having been built on the remote server, the instructions for functional tests being transmitted with the installation instructions to the plurality of distributed ones of the remote server, over the computer network.

11. The method of claim 7, further comprising:
    generating, by the service processor, revised instructions for automatic functional tests to be performed on the revised machine image after having been rebuilt on the remote server, the revised instructions for functional tests being transmitted with the revised installation instructions to the plurality of distributed ones of the remote server, over the computer network.

12. The method of claim 7, wherein a machine image builder software executes the installation instructions for building the machine image on the remote server, for each of the plurality of distributed ones of the remote server in the computer network.

13. A computer program product comprising computer executable program code recorded on a computer readable, non-transitory storage medium, for managing machine images on a plurality of distributed servers over a computer network, the computer executable program code comprising:
    code for generating, by a service processor, installation instructions for a remote server of a plurality of distributed remote servers on a computer network, to build by the remote server a machine image on the remote server, the machine image comprising at least one component, the installation instructions including instructions for the remote server to access over the network the at least one component from a source of the at least one component;
    code for transmitting, by the a service processor, to the plurality of distributed remote servers, over the computer network, the installation instructions for building by the remote server the machine image on the remote server;
    code for generating, by the service processor, revised installation instructions for building by the remote server a revised machine image on the remote server in response to the service processor receiving a notification of an update from a reactive management processor, the revised installation instructions including instructions for the remote server to access over the network the update of the at least one component from the source of the at least one component and to build the revised machine image on the remote server; and
    code for transmitting, by the service processor, to the plurality of distributed remote servers, over the computer network, a global rebuild command and the revised installation instructions for rebuilding by the remote server the revised machine image on the remote server.

14. The computer program product of claim 13, wherein the global rebuild command is transmitted by the service processor in response to at least one of a change to the installation instructions, a change to an installed software component, a change to a library used, or a change to a base operating system patch status.

15. The computer program product of claim 13, wherein the source of the at least one component is a publisher of software components or a storage device storing software components.

16. The computer program product of claim 13, further comprising:

code for generating, by the service processor, instructions for automatic functional tests to be performed on the machine image after having been built on the remote server, the instructions for functional tests being transmitted with the installation instructions to the plurality of distributed ones of the remote server, over the computer network.

17. The computer program product of claim 13, further comprising:

code for generating, by the service processor, revised instructions for automatic functional tests to be performed on the revised machine image after having been rebuilt on the remote server, the revised instructions for functional tests being transmitted with the revised installation instructions to the plurality of distributed ones of the remote server, over the computer network.

18. The computer program product of claim 13, wherein a machine image builder software executes the installation instructions for building the machine image on the remote server, for each of the plurality of distributed ones of the remote server in the computer network.

* * * * *